(12) United States Patent
Picha (10) Patent No.: US 7,630,488 B2
(45) Date of Patent: Dec. 8, 2009

(54) DTMF TONE GENERATION IN A MEDIA GATEWAY

(75) Inventor: Marianne Picha, Batavia, IL (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 1030 days.

(21) Appl. No.: 10/439,646

(22) Filed: May 16, 2003

(65) Prior Publication Data
US 2004/0228471 A1    Nov. 18, 2004

(51) Int. Cl.
  H04M 3/00    (2006.01)
  H04M 5/00    (2006.01)
(52) U.S. Cl. ............... 379/283; 370/352; 370/356
(58) Field of Classification Search ......... 379/283; 370/352, 356
See application file for complete search history.

(56) References Cited

U.S. PATENT DOCUMENTS

| | | | | |
|---|---|---|---|---|
| 5,818,930 A | * | 10/1998 | Mark | 379/444 |
| 6,088,437 A | * | 7/2000 | Amick | 379/211.02 |
| 6,151,514 A | * | 11/2000 | Cheng et al. | 455/564 |
| 6,259,691 B1 | * | 7/2001 | Naudus | 370/352 |
| 6,487,196 B1 | * | 11/2002 | Verthein et al. | 370/352 |
| 6,526,026 B1 | * | 2/2003 | Menon | 370/310 |
| 6,594,256 B1 | * | 7/2003 | Koide | 370/352 |
| 6,771,741 B2 | * | 8/2004 | Kliland | 379/39 |
| 6,785,267 B1 | * | 8/2004 | Knappe | 370/353 |
| 7,079,500 B2 | * | 7/2006 | Menon | 370/310 |
| 7,133,521 B2 | * | 11/2006 | Jabri et al. | 379/386 |
| 2002/0176542 A1 | * | 11/2002 | Lazarus et al. | 379/3 |
| 2003/0021394 A1 | * | 1/2003 | Krack | 379/88.01 |
| 2003/0108020 A1 | * | 6/2003 | Garcia-Martin | 370/338 |
| 2003/0137952 A1 | * | 7/2003 | Menon | 370/328 |

* cited by examiner

*Primary Examiner*—Quynh H Nguyen
(74) *Attorney, Agent, or Firm*—Fay Sharpe, LLP (57) ABSTRACT

A system and method for generating Dual Tone Multi-Frequency (DTMF) tones in the media gateway of a Universal Mobile Telecommunications System (UMTS) network. The method includes receiving a DTMF signal in a media gateway controller, where the DTMF signal can be a stop tone request, or a start tone request, sending the DTMF signal from the media gateway controller to the media gateway, monitoring the status of a set of timers, where the set of timers includes a minimum tone duration timer, an inter tone timer, and a maximum tone duration timer, and responding to the received DTMF signal, said status of said timers, or a queued request. The system includes a media gateway, a plurality of timers within the media gateway, a media gateway controller, a finite state machine within the media gateway, where the finite state machine includes the following states: No Tone, Play Tone, Queue Stop Request, Inter Tone Timing, Queue Start Request, and Ready to Stop Tone.

23 Claims, 5 Drawing Sheets

DTMF TONE GENERATION IN A MEDIA GATEWAY

BACKGROUND OF THE INVENTION

The present invention relates generally to wireless telecommunications and more particularly to a system and method of generating Dual Tone Multi-Frequency tones in the media gateway of a Universal Mobile Telecommunications System network.

A major effort has been made in the last decade to integrate multimedia capabilities and mobile communications. For example, the International Telecommunications Union (ITU) and other organizations have been developing standards and recommendations to insure that mobile communications in the future will be able to support multi-media applications of at least the same quality as existing fixed networks. More specifically, many global research projects have been sponsored in order to develop such next third generation (3G) mobile systems. 3G systems are intended to provide a global mobility with wide range of services including telephony, paging, messaging, Internet and broadband data. In particular, the 3rd Generation Partnership Project (3GPP) was formed for technical development relating to this new mobile communications technology. The Universal Mobile Telecommunications System (UMTS) is a new radio access network, which is optimized for support of 3G services, including multi media-capable mobile communications.

One important aspect of any telecommunications system, including a UMTS network, is support of Dual Tone Multi-Frequency (DTMF) signaling. In fact, the UMTS standards specify that such systems must support DTMF signaling in the mobile-to-land direction. Generally, DTMF is the signal to the phone company that is generated when the telephone network user presses a key on the user equipment (e.g., a mobile phone). In the United States, it is more commonly known as "Touchtone" dialing. DTMF tones are used to allow a telephone network user to do such things as interact with voice mail systems, perform electronic banking, or direct the functioning of an Advanced Intelligence Network service.

Under the UMTS standards, which are described in detail in a number of technical specifications put out by 3GPP, the UMTS network must ensure that the minimum length of tone and the minimum gap between two subsequent tones is achieved. These two times have been defined in the standards. There is no defined maximum length to the tone, however. Significantly, the UMTS standards do not specify how to implement these important concepts.

Thus, there is a need in the art to provide an implementation of the UMTS standards for interconnecting DTMF signals that are present in the UMTS network and playing the tones for different durations.

SUMMARY OF THE INVENTION

According to the present invention, a system and method of generating DTMF tones in the media gateway of a UMTS network is provided.

In accordance with one aspect of the present invention, the method includes receiving a DTMF signal in a media gateway controller, where the DTMF signal can be either a Stop Tone request, or a Start Tone request, sending the DTMF signal from the media gateway controller to the media gateway, monitoring the status of a set of timers, where the set of timers includes a minimum tone duration timer, an inter tone timer, and a maximum tone duration timer, and responding based on the received DTMF signal, the status of the timers, or a queued request.

In accordance with another aspect of the present invention, the system includes a media gateway, which includes a set of timers, a media gateway controller, a finite state machine within the media gateway, where the finite state machine includes the following states: No Tone, Play Tone, Queue Stop Request, Inter Tone Timing, Queue Start Request, and Ready to Stop Tone.

The advantages and benefits of the present invention will become apparent to those of ordinary skill in the art upon reading and understanding the following detailed description of the preferred embodiments.

BRIEF DESCRIPTION OF THE DRAWINGS

The drawings are only for purposes of illustrating preferred embodiments and are not to be construed as limiting the invention. The invention may take form in various components and arrangements of components, and in various of steps and arrangements of steps, the preferred embodiments of which will be illustrated in the accompanying drawings wherein.

DETAILED DESCRIPTION OF THE INVENTION

It is understood that the specific devices and processes illustrated in the attached drawings and described in the following specification are simply exemplary embodiments of the inventive concepts defined in the appended claims. Therefore, specific examples and characteristics relating to the embodiments disclosed herein are not to be considered as limiting, unless the claims expressly state otherwise.

Figure 1:
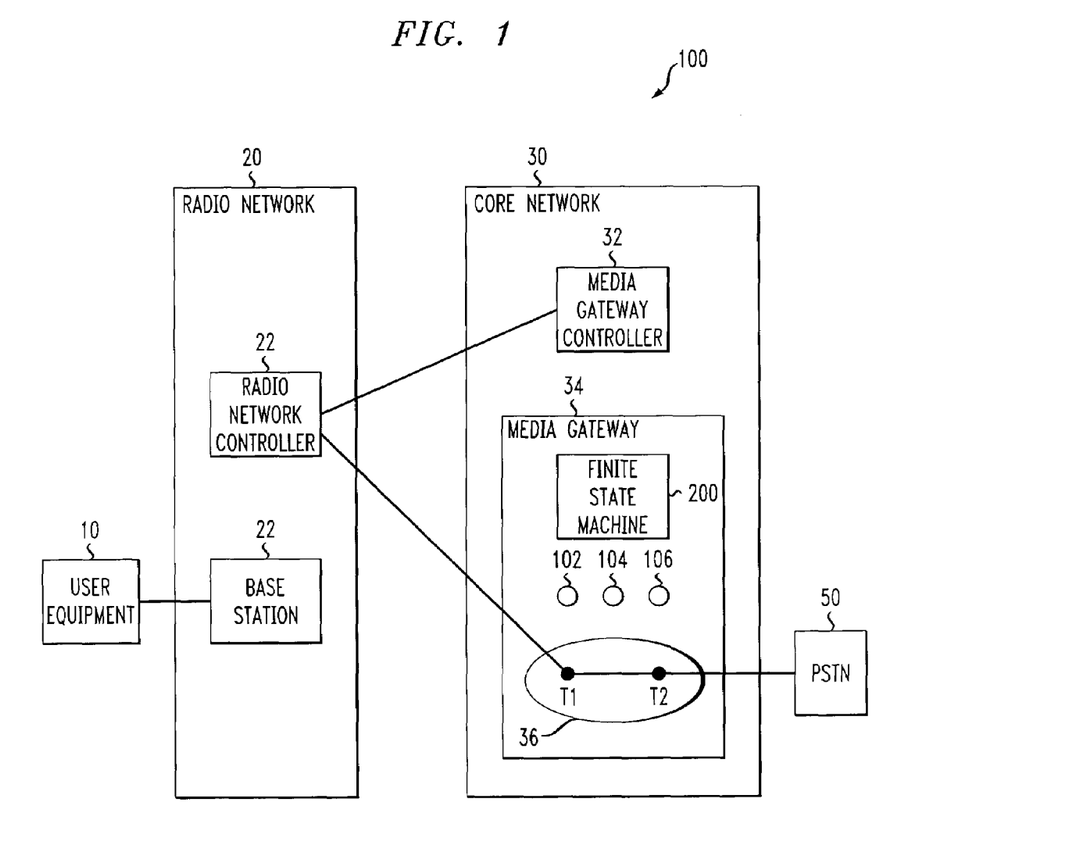
FIG. 1 is a simplified block diagram of a typical Universal Mobile Telecommunication System network useful for discussing the present invention.

Referring to the drawings, FIG. 1 illustrates a simplified block diagram of a typical UMTS network 100 in which a preferred embodiment of the present invention can be employed. Particularly, when initiating a mobile call, user equipment 10 communicates with a radio network 20 having at least one base station 22 via a wireless link. The user equipment 10 may be one of a variety of communication devices, such as a wireless phone or a portable personal computer with an internal or external modem. The base station 22 is in communication with and controlled by a radio network controller 24.

The radio network controller 24, in turn, communicates with a core network 30, which may include, among other things, a service provider softswitch 32 and a media gateway 34. The softswitch 32 is a packet switch, well known in the art, which discerns network technology and provides signaling protocols. Thus, the softswitch 32 provides the necessary call processing intelligence to the media gateway 34.

The media gateway 34 is an element in the wireless network—enabling voice and data traffic to employ multiple media paths and traverse across a converged network. The media gateway 34 provides packet switching, transcoding, and media manipulation, such as tones, conferencing, and splitting, among other things. Acting as a translation unit, the media gateway 34 enables communication between disparate networks. For each mobile call, a context 36 having at least a pair of terminations T1 and T2 is created within the media gateway 34. The terminations T are logical entities within the media gateway 34, which act as sources of packet streams. The context 36 is an association between terminations T for sharing media between the terminations. The terminations T can be added or subtracted from the context 36, and they can be moved from one context to another. Each context 36 and all of the terminations T it contains are associated with a single media gateway controller 32. As shown in FIG. 1, the terminations T1 and T2 are in communication with each other. Voice, data, video and other media are transmitted through the radio network 20 to termination T1. Meanwhile, signals such as DTMF signals are transmitted through the radio network 20 to the softswitch 32, and then on to termination T2. The termination T2 is also in communication with the Public Switched Telephone Network (PSTN) 50.

Figure 2:
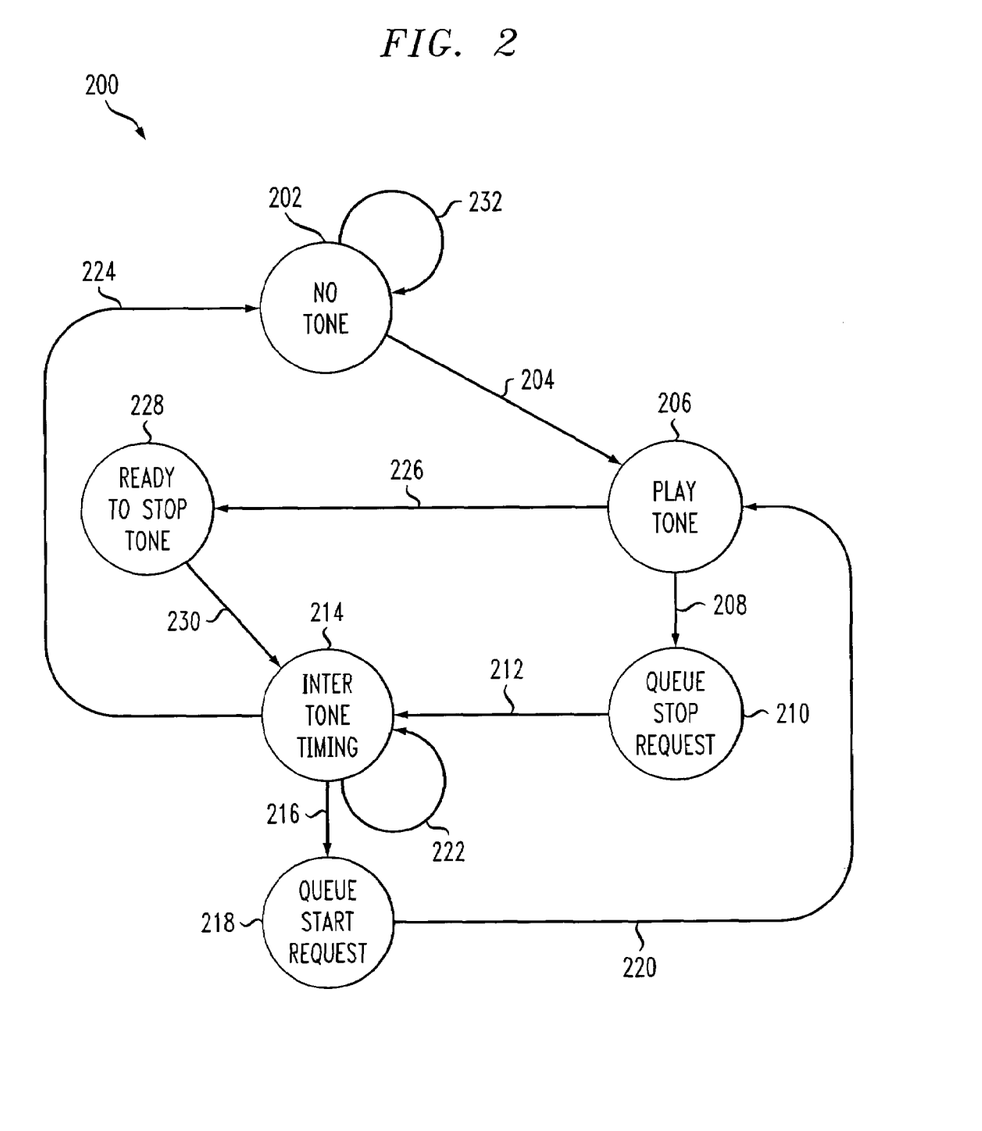
FIG. 2 is a block diagram of a finite state machine for generating DTMF tones in a media gateway according to the present invention.

The softswitch 32 communicates with the media gateway 34 with standards-based control protocols, such as Megaco, and routes applicable inbound calls to the user's service. Megaco stands for "media gateway control." Megaco (also known as H.248) is a protocol that operates between a media gateway and a media gateway controller such as a softswitch, allowing the softswitch to control the media gateway. H.248/Megaco is an emerging standard enabling voice, fax and multimedia calls to be switched between the PSTN and emerging IP networks. However, H.248/Megaco simply provides for a single duration for the DTMF tone, which is not in compliance with the UMTS standards. Therefore, the media gateway 34 preferably includes a finite state machine 200 for generating DTMF tones of different durations in the media gateway 34. To implement the finite state machine 200, the media gateway 34 further includes a set of timers 102, 104, and 106. The MIN timer 102 defines the minimum duration of a DTMF tone, the INTER TONE timer 104 defines the minimum interval between consecutive DTMF tones, and the MAX timer 106 defines the maximum duration of a DTMF tone.

Accordingly, when a user presses a key on the user equipment 10, a DTMF signal is routed through the radio network 20 to the softswitch 32. The softswitch 32, in turn, sends an H.248 command to the media gateway 34 to play a tone. The media gateway 34 ultimately sources the tone to the PSTN 50 through the termination T2. This process of DTMF tone generation in a media gateway may be accomplished successfully and in accordance with the applicable industry standards through implementation of the novel finite state machine 200. The operation of the finite state machine 200 will be explained in greater detail below.

Referring to FIG. 2, a preferred embodiment of the finite state machine 200 for generating DTMF tones in the media gateway 34 is shown. A common means to implement a communication protocol is to use a finite state machine (FSM). A finite state machine is a machine which has a fixed and finite number of states and in which transitions from one state to another are defined by transition rules. In FIG. 2, each state is indicated by a circle, while arrows connecting the states indicate allowed transitions.

Thus, starting at the top of the FSM 200, a No Tone state 202 is the initial and final state of the FSM 200. The FSM 200 is in the No Tone state 202 prior to a key (or digit) on user equipment 10 being pressed. In this state, none of the timers 102, 104, or 106 have been started. When the first digit is pressed on the user equipment 10, a Start Tone Request is made and the first transition 204 occurs to a Play Tone state 206. At this time, the MIN timer 102 and the MAX timer 106 are started. If a Stop Tone Request is received and the MIN timer 102 has not expired, there is a transition 208 to a Queue Stop Request state 210. Once the MIN timer 102 expires, a return acknowledgement is sent and there is a transition 212 to an Inter Tone Timing state 214. In this state, the DTMF tone has stopped playing and the INTER TONE timer 122 has started. If a Start Tone Request is received, there is a transition 216 to a Queue Start Request state 218. When the INTER TONE timer 104 expires, there is a transition 220 back to Play Tone state 206. On the other hand, if a Stop Tone Request is received in the Inter Tone Timing state 214 and the INTER TONE timer 104 has not expired, a transition 222 returns to the state in which it began, the Inter Tone Timing state 214. However, if the INTER TONE timer 104 expires, there is a transition 224 to a No Tone State 202.

Returning now to the Play Tone state 206, if the MIN timer 102 expires, there is a transition 226 to a Ready To Stop Tone state 228. If either a Stop Tone Request is received or the MAX timer 106 expires, there is a transition 230 to the Inter Tone Timing state 214. Finally, if a Stop Tone Request is received in the No Tone state 202, the transition 232 returns to the state in which it started, the No Tone state 202. Thus, the only states in which the tone is actually playing are the Play Tone state 206, the Queue Stop Request state 218, and the Ready To Stop Tone state 228.

Figure 3:
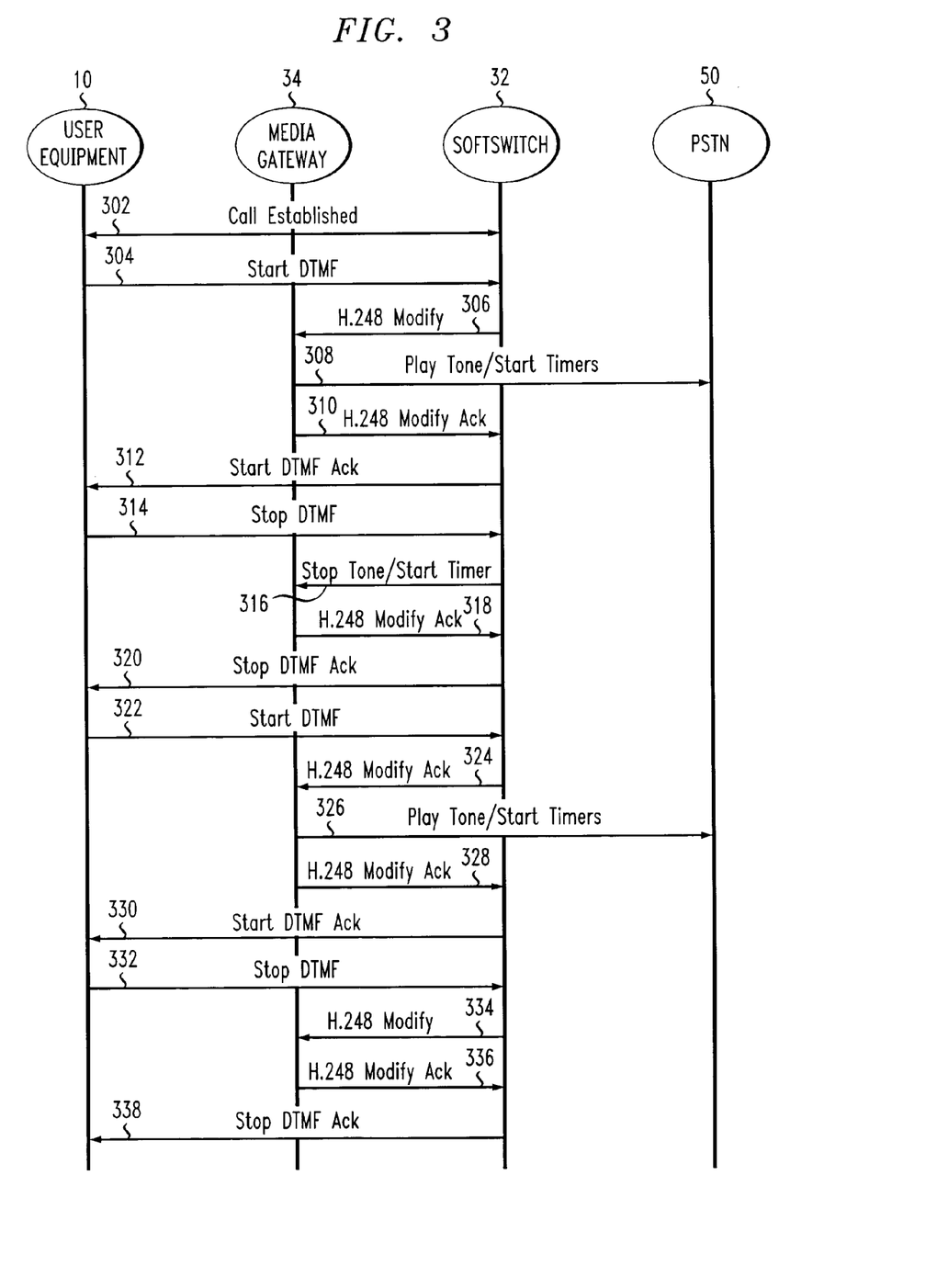
FIG. 3 is a call flow diagram illustrating a short tone duration according to the present invention.
Figure 4:
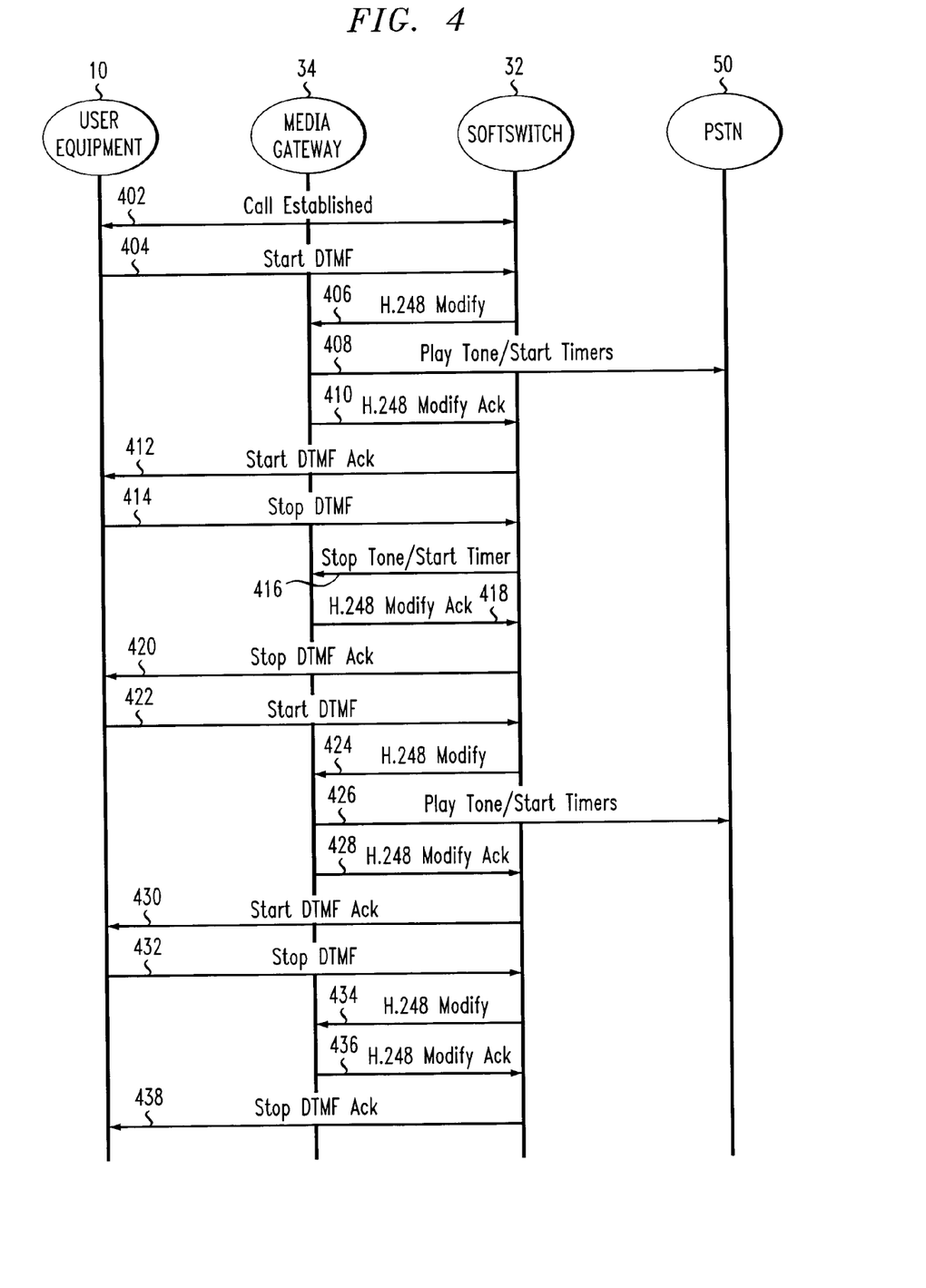
FIG. 4 is a call flow diagram illustrating a short gap between tones according to the present invention.
Figure 5:
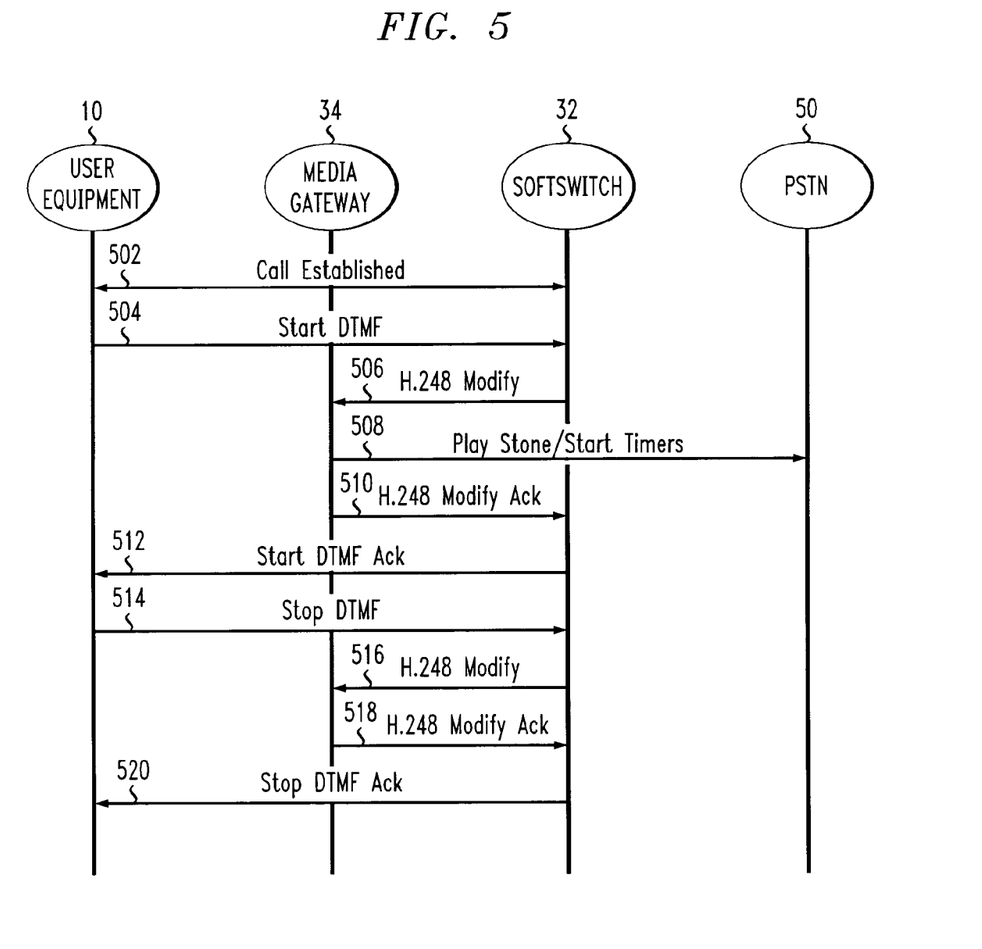
FIG. 5 is a call flow diagram illustrating a maximum tone duration according to the present invention.

FIGS. 3-5 illustrate several examples of call flow diagrams for various situations and are helpful in understanding the implementation of FSM 200. Referring now to FIG. 3, there is shown a call flow diagram illustrating an implementation of the FSM 200 for a Mobile-to-PSTN call having a short DTMF tone duration. Initially, a call from user equipment 10 to the PSTN 50 is established (302). The user equipment 10 then sends a Start DTMF message with digit (or key) information to the softswitch 32 (304). This is a request to play a single DTMF tone. The softswitch 32 sends an H.248 Modify command to the media gateway 34 to instruct the media gateway 34 to apply the tone (306) on the termination T2. As a result, the media gateway 34 starts two timers, the MIN timer 102 and the MAX timer 106, and turns on the DTMF tone (308). The media gateway 34 then sends an H.248 Modify acknowledgement to the softswitch 32 (310). The softswitch 32 sends a Start DTMF acknowledge back to user equipment 10 (312). Meanwhile, the MIN timer 102 expires, and the tone is ready to be stopped.

Next, the user equipment 10 sends a Stop DTMF message to the softswitch 32 (314). The softswitch 32 then sends an H.248 Modify command to the media gateway 34 to instruct the media gateway 34 to stop applying the DTMF tone (316). The media gateway 34 turns off the tone, stops the MAX timer 106 and starts the INTER TONE timer 104 to "guard" the inter-digit interval. The media gateway 34 sends an H.248 Modify Acknowledgement message back to the softswitch 32 (318). The softswitch 32 then sends a Stop DTMF acknowledgement back to user equipment 10 (320). Meanwhile, the INTER TONE timer 104 expires, and a new tone request can now be processed.

User equipment 10 then sends a Start DTMF command with digit information to the softswitch 32 (322). The softswitch 32 sends an H.248 Modify command to the media gateway 34 to instruct the media gateway 34 to apply the DTMF tone on the termination T2 (324). The media gateway 34 starts the MIN timer 102 and the MAX timer 106 and turns on the tone (326). The media gateway 34 sends an H.248 Modify acknowledgement back to the softswitch 32 (328).

The softswitch 32 sends a Start DTMF acknowledgement back to the user equipment 10 (330). As a result, the user equipment 10 sends a Stop DTMF message to the softswitch 32 (332). The softswitch 32 sends an H.248 Modify command to the media gateway 34 to instruct the media gateway 34 to stop applying the DTMF tone on the termination T2 (334). At this point, MIN timer 102 has not expired yet, and the stop signal is queued. When the MIN timer 102 expires, the media gateway 34 turns off the tone, stops the MAX timer 106 and starts the INTER TONE timer 104. The media gateway 34 sends an H.248 Modify acknowledgement back to the softswitch 32 (336). Finally, the softswitch 32 sends a Stop DTMF acknowledgement back to the user equipment 10 (338).

FIG. 4 is a call flow diagram illustrating an implementation of the FSM 200 for a Mobile-to-PSTN call having a short gap between DTMF tones. Initially, a call from the user equipment 10 to the PSTN 50 is established (402). The user equipment 10 then sends a Start DTMF message with digit information to the softswitch 32 (404). This is a request to play a single DTMF tone. The softswitch 32 sends an H.248 Modify command to the media gateway 34 to instruct the media gateway 34 to apply the tone (406) on the termination T2. As a result, the media gateway 34 starts two timers, the MIN timer 102 and the MAX timer 106, and turns on the DTMF tone (408). The media gateway 34 then sends an H.248 Modify acknowledgement to the softswitch 32 (410). The softswitch 32 sends a Start DTMF acknowledge back to the user equipment 10 (412). Meanwhile, the MIN timer 102 expires, and the tone is ready to be stopped.

Next, the user equipment 10 sends a Stop DTMF message to the softswitch 32 (414). The softswitch 32 then sends an H.248 Modify command to the media gateway 34 to instruct the media gateway 34 to stop applying the tone on the termination T2 (416). The media gateway 34 turns off the tone, stops the MAX timer 106 and starts the INTER TONE timer 104 to guard the inter-digit interval. The media gateway 34 sends an H.248 Modify acknowledgement back to the softswitch 32 (418). The softswitch then sends a Stop DTMF acknowledgement back to the user equipment 10 (420).

The user equipment 10 then sends a Start DTMF message with digit information to the softswitch 32 (422). The softswitch 32 sends an H.248 Modify command to the media gateway 34 to instruct the media gateway 34 to apply the DTMF tone on the termination T2 (424). Since the INTER TONE timer 104 has not expired, the new tone request must be queued until the INTER TONE timer 104 has expired. Once the INTER TONE timer 104 expires, the media gateway 34 starts the MIN timer 102 and the MAX timer 106 and turns on the tone (426). The media gateway 34 sends an H.248 Modify acknowledgement back to the softswitch 32 (428). The softswitch 32 sends a Start DTMF acknowledgement back to user equipment 10 (430). As a result, the user equipment 10 sends a Stop DTMF message to the softswitch 32 (432). Meanwhile, the MIN timer 102 expires, and the tone is ready to be stopped. The softswitch 32 sends an H.248 Modify command to the media gateway 34 to instruct the media gateway 34 to stop applying the tone on the termination T2 (434). The media gateway 34 turns off the tone, stops the MAX timer 106 and starts the INTER TONE timer 104. The media gateway 34 sends an H.248 Modify acknowledgement back to the softswitch 32 (436). Finally, the softswitch 32 sends a Stop DTMF acknowledgement back to the user equipment 10 (438).

FIG. 5 is a call flow diagram illustrating an implementation of the FSM 200 for a Mobile-to-PSTN call having a maximum DTMF tone duration. Initially, a call from the user equipment 10 to the PSTN 50 is established (502). The user equipment 10 then sends a Start DTMF message with digit information to the softswitch 32 (504). This is a request to play a single DTMF tone. The softswitch 32 sends an H.248 Modify command to the media gateway 34 to instruct the media gateway 34 to apply the DTMF tone (506) on the termination T2. As a result, the media gateway 34 starts two timers, the MIN timer 102 and the MAX timer 106, and turns on the tone (508). The media gateway 34 then sends an H.248 Modify acknowledgement to the softswitch 32 (510). The softswitch 32 sends a Start DTMF acknowledge back to user equipment 10 (512). Meanwhile, the MIN timer 102 expires, and the tone is ready to be stopped. Then, the MAX timer 106 expires, the tone is turned off and the INTER TONE timer 104 is started. After the INTER TONE timer 104 expires, the FSM 200 is ready for the next tone.

The user equipment 10 sends a Stop DTMF message to the softswitch 32 (514). The softswitch 32 sends an H.248 Modify command to the media gateway 34 to instruct the media gateway 34 stop applying the tone on the termination T2 (516). Since the tone is already off, no action is needed. The media gateway 34 sends an H.248 Modify acknowledgement back to the softswitch 32 (518). Finally, the softswitch 32 sends a Stop DTMF acknowledgement back to the user equipment 10 (520).

Thus, the FSM 200 describes the DTMF control standard for wireless subscribers in a UMTS network and enforces minimum tone, maximum tone, and inter-digit timing tolerances for DTMF tones, all in accordance with the applicable industry standards. It will be appreciated by those skilled in the art that the FSM 200 may be implemented through various types of hardware and software.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalence thereof.

What is claimed is:

1. A method for generating dual tone multi-frequency (DTMF) tones in a media gateway within a wireless communications network, said method comprising:
   receiving a DTMF signal in a media gateway controller, said DTMF signal comprising a Stop Tone request or a Start Tone request, wherein said media gateway controller is in communication with said media gateway and controls said media gateway;
   sending said DTMF signal from said media gateway controller to said media gateway;
   monitoring a status of a plurality of timers in said media gateway to implement a finite state machine, said plurality of timers comprising a minimum tone duration timer, an inter tone timer, and a maximum tone duration timer, said status of said timers being off, on, or expired; and
   using said finite state machine located within the media gateway to generate DTMF tones of different durations in the media gateway and to respond to at least one of said received DTMF signal, said status of said timers, or a prior queued request based on a DTMF signal.

2. The method defined in claim 1 wherein said responding step includes playing no tone, where said DTMF signal is a Stop Tone request and said status of each of said timers is off.

3. The method defined in claim 2 wherein said responding step includes playing a tone and starting said minimum and maximum timers, where said DTMF signal is a Start Tone request and said status of each of said timers is off.

4. The method defined in claim 3 wherein said responding step includes playing a tone, expiring said maximum timer, and queuing a Stop Tone request, where said DTMF signal is a Stop Tone request, said status of said minimum and maximum timers is on and said status of said inter tone timer is off.

5. The method defined in claim 4 wherein said responding step includes playing no tone and starting said inter tone timer, where said queued request is a Stop Tone request, said status of said minimum and maximum timers is expired, and said status of said inter tone timer is off.

6. The method defined in claim 5 wherein said responding step includes playing no tone and queuing a Start Tone request, where said DTMF signal is a Start Tone request, said status of said inter tone timer is on, and said status of said minimum and maximum timers is expired.

7. The method defined in claim 6 wherein said responding step includes playing a tone, where said status of said maximum timer is on, said status of said minimum timer is expired, and said status of said inter tone timer is off.

8. The method defined in claim 7 wherein said responding step includes playing no tone, where said status of each of said timers is expired.

9. The method defined in claim 8 wherein said responding step includes playing no tone, expiring said maximum timer, and starting said inter tone timer, where said DTMF signal is a Stop Tone request, said status of said minimum timer is expired, said status of said maximum timer is on, and said status of said inter tone timer is off.

10. The method defined in claim 9 wherein said responding step includes playing no tone and starting said inter tone timer, where said status of said minimum and maximum timers is expired, and said status of said inter tone timer is off.

11. The method defined in claim 10 wherein said responding step includes playing no tone where said DTMF signal is a Stop Tone request, said status of said minimum and maximum timers is expired, and said status of said inter tone timer is on.

12. The method defined in claim 11 wherein the said responding step includes playing a tone and starting said minimum and maximum timers, where said queued request is a Start Tone request, said status of said minimum and maximum timers is expired, and said status of said inter tone timer is expired.

13. The method defined in claim 12 wherein said sending step further includes sending said DTMF signal via an H.248/Megaco protocol.

14. The method defined in claim 13 said wireless communications network is a Universal Mobile Telecommunications System network.

15. The method defined in claim 14 wherein said media gateway controller is a softswitch.

16. A system for generating DTMF tones in a wireless communications network, said system comprising:
a media gateway for receiving a DTMF signal from user equipment via a radio network, said DTMF signal comprising either a stop tone request or a start tone request;
a plurality of tone timers within said media gateway to implement a finite state machine;
a media gateway controller in communication with said media gateway for controlling said media gateway and for monitoring a status of said timers; and
the finite state machine within said media gateway for generating DTMF tones of different durations in the media gateway and responding to said received DTMF signal and said status of said timers.

17. The system defined in claim 16 wherein said plurality of timers includes a minimum tone duration timer, an inter tone timer, and a maximum tone duration timer.

18. The system defined in claim 16 wherein said finite state machine comprises a plurality of states and a plurality of transitions between said states.

19. The system defined in claim 18 wherein said plurality of states comprises No Tone, Play Tone, Queue Stop Request, Inter Tone Timing, Queue Start Request, and Ready to Stop Tone states.

20. The system defined in claim 19 wherein a tone is played in each of said Play Tone, Queue Stop Request, and Ready to Stop Tone states.

21. A system for generating DTMF tones in a wireless communications network, said system comprising:
a media gateway;
a media gateway controller in communication with the media gateway that controls the media gateway;
a finite state machine within said media gateway for generating DTMF tones of different durations in the media gateway and responding to DTMF signal and status of a plurality of timers, said finite state machine comprising a plurality of states and a plurality of transitions between said states, said plurality of states comprising No Tone, Play Tone, Queue Stop Request, Inter Tone Timing, Queue Start Request, and Ready to Stop Tone states; and
said plurality of timers within said media gateway to implement said finite state machine.

22. The system defined in claim 21 wherein said plurality of timers comprises a minimum tone duration timer, an inter tone timer, and a maximum tone duration timer.

23. The system as defined in claim 22 wherein a tone is played in each of said Play Tone, Queue Stop Request, and Ready to Stop Tone states.

* * * * *

UNITED STATES PATENT AND TRADEMARK OFFICE
CERTIFICATE OF CORRECTION

PATENT NO. : 7,630,488 B2  Page 1 of 1
APPLICATION NO. : 10/439646
DATED : December 8, 2009
INVENTOR(S) : Marianne Picha It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1699 days.

Signed and Sealed this

Twenty-first Day of December, 2010

David J. Kappos
*Director of the United States Patent and Trademark Office*